Aug. 18, 1925.
E. L. MILLER ET AL
HEAT EQUALIZING DEVICE
Filed Jan. 20, 1925
1,549,785
2 Sheets-Sheet 1
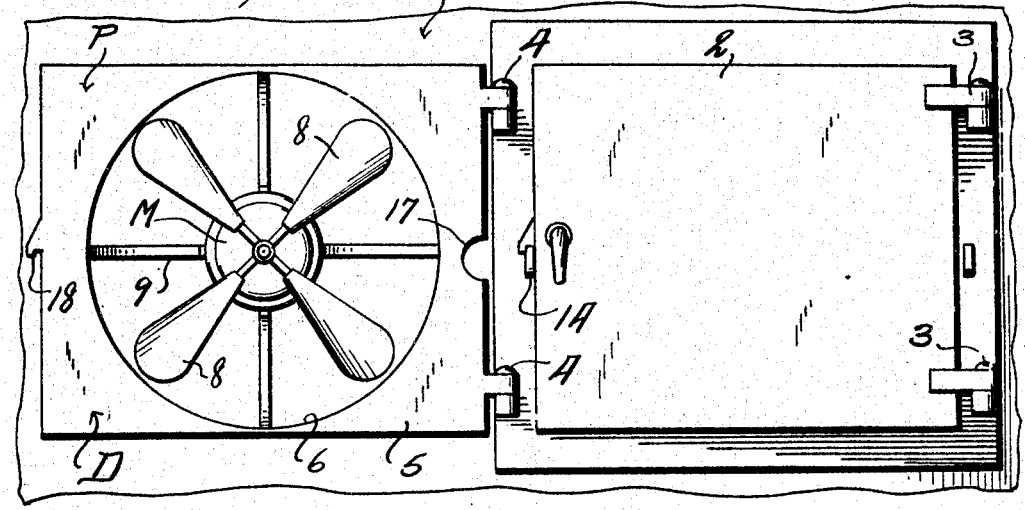
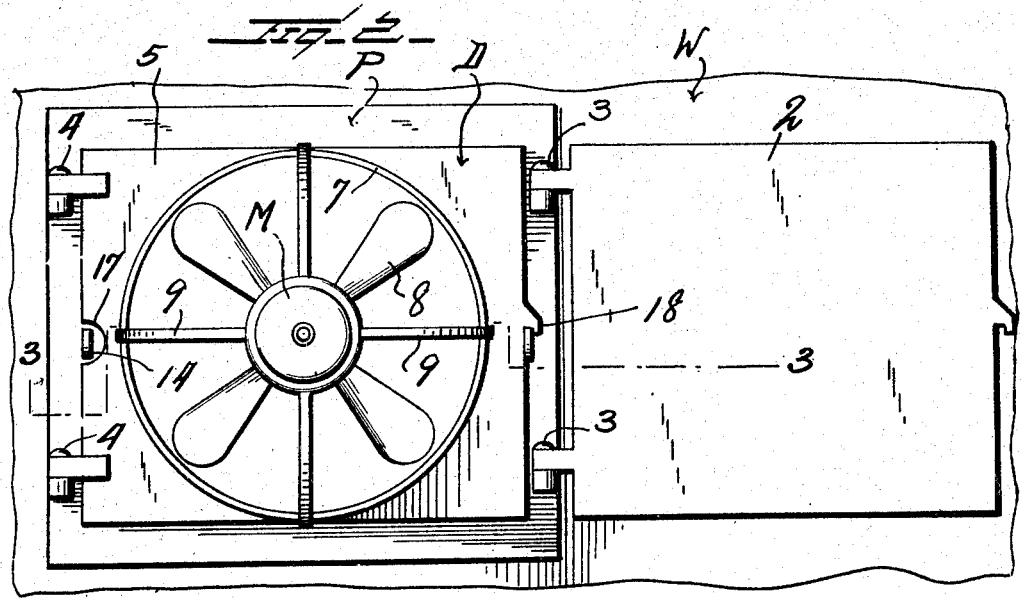
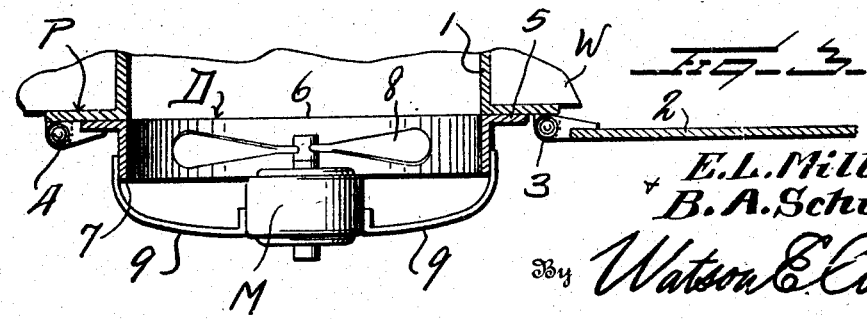
Inventors
E. L. Miller
B. A. Schulz
By Watson E. Coleman
Attorney

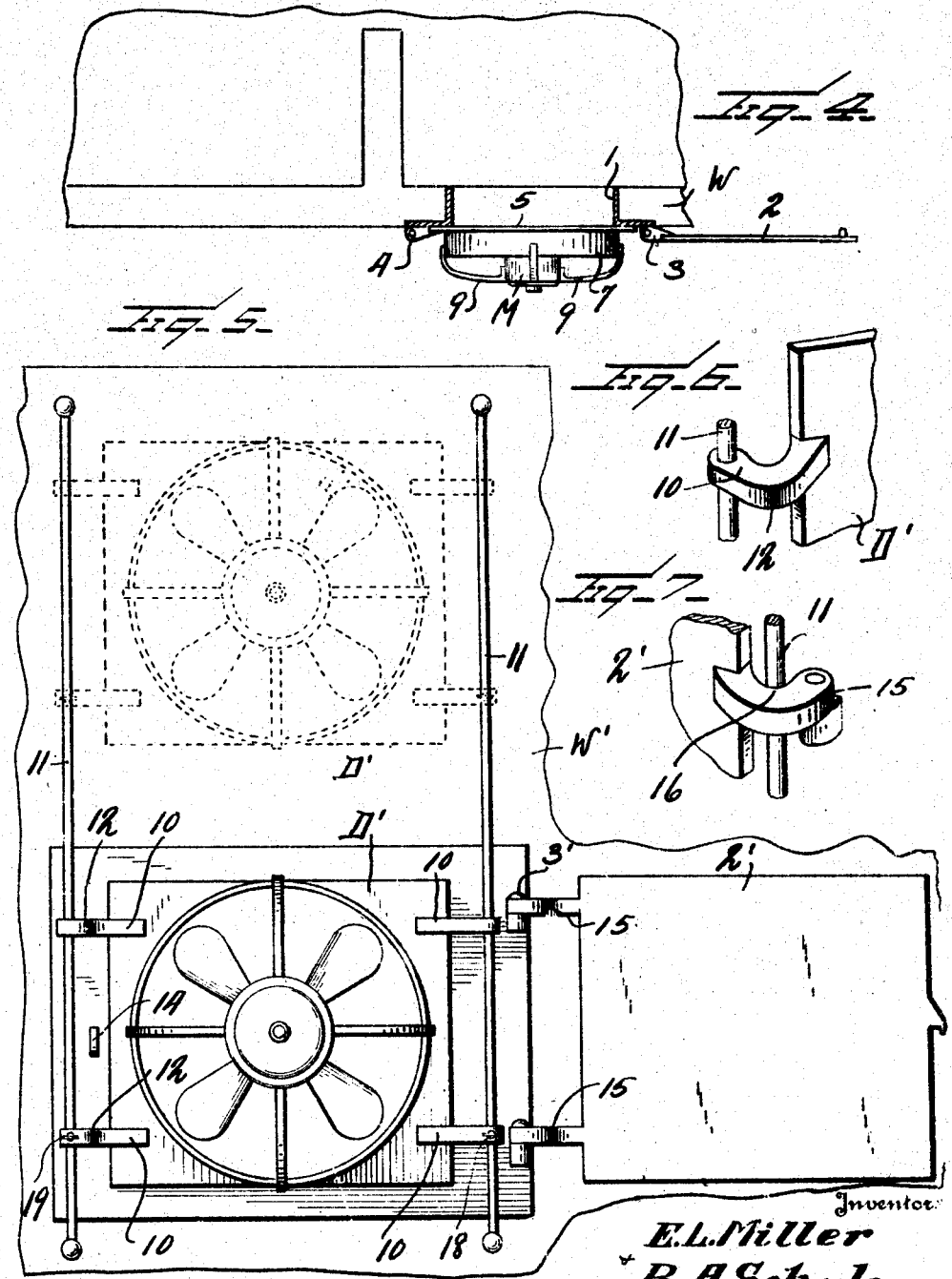

Patented Aug. 18, 1925.

1,549,785

UNITED STATES PATENT OFFICE.

ERVIN L. MILLER AND BERNIE A. SCHULZ, OF INTERNATIONAL FALLS, MINNESOTA.

HEAT-EQUALIZING DEVICE.

Application filed January 20, 1925. Serial No. 3,624.

*To all whom it may concern:*

Be it known that we, ERVIN L. MILLER and BERNIE A. SCHULZ, citizens of the United States, residing at International Falls, in the county of Koochiching and State of Minnesota, have invented certain new and useful Improvements in Heat-Equalizing Devices, of which the following is a specification, reference being had to the accompanying drawings.

This invention relates to heat equalizing devices and has relation more particularly to a device of this kind especially designed and adapted for use in connection with ovens such as used by bakers, and it is an object of the invention to provide novel and improved means whereby the intense heat is transferred from directly in front of the fire pot to the remainder of the oven to obtain an even temperature at all points within the oven.

Another object of the invention is to provide a novel and improved device operating in a manner to permit the oven to be used for baking within a relatively short period of time after firing.

An additional object of the invention is to provide a device of this kind which operates to cause the heat to be driven into the walls, hearth and arch of the oven to be held thereby as a reserve and to seep out gradually when baking, such heating of the walls, hearth and arch being with substantial uniformity thereby enabling a baker to put out a great deal more goods on one firing.

The invention consists in the details of construction and in the combination and arrangement of the several parts of our improved heat equalizing device whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a fragmentary view in elevation illustrating an equalizing device constructed in accordance with an embodiment of our invention in inoperative position;

Figure 2 is a view similar to Figure 1 showing our improved device in operative position;

Figure 3 is a sectional view taken substantially on the line 3—3 of Figure 2;

Figure 4 is a diagrammatic view of a part in section illustrating our improved device in working position;

Figure 5 is an elevational view illustrating a further embodiment of our invention, a second position of the device being indicated by broken lines;

Figure 6 is a fragmentary view in perspective illustrating a hinge connection for the device as disclosed in Figure 5;

Figure 7 is a fragmentary view in perspective of a hinge connection for the door as disclosed in Figure 5.

In the embodiment of our invention as particularly illustrated in Figures 1 to 4, W denotes the wall of a baker's oven of any desired type provided with the furnace opening 1 adapted to be closed by the door 2. As illustrated, the door 2 is hingedly connected, as at 3, to one side of the furnace opening 1 and hingedly connected, as at 4, to the opposite side of the opening 1 is our improved device D, the device D being disposed over the furnace opening 1 when the door 2 is fully open and vice versa.

Our improved device as herein disclosed, comprises a plate 5 of requisite dimensions provided with a relatively large central opening 6, the opening 6 being defined by an outstanding continuous flange 7.

Substantially housed within the chamber afforded by the flange 7 is a fan 8 driven by the motor M preferably of an electrical type, said motor being supported substantially at the axial center of the opening 6 by the arms 9 interposed between and connected to the motor M and the flange 7.

When the device D is in its working position as illustrated in Figures 2 and 3, the rotation of the fan 8 by the motor M will force an air blast into the furnace over the hot fire pot, driving the heat equally within the walls, hearth and arch and thereby giving equal distribution of heat throughout the entire oven and thereby permitting the furnace to be fired more heavily than is now generally done due to the fact that the heat is equalized and can be driven into the walls, hearth and arch to be held in reserve for larger production and also giving the required quality that is demanded in bakery product. In fact it has been found in actual practice that with the use of our improved equalizer the output of an oven may be substantially doubled on one firing and it is assured that the heat is equally or uniformly distributed as the bread or other articles baked are not a shade lighter or darker on one side or corner of the oven than at any other point within the oven.

In Figures 5 and 6 we illustrate an embodiment of our invention wherein under certain conditions it will not be advantageous to hingedly connect or support our improved distributer. As disclosed in these figures, the device D' is substantially the same as the device D except that it is provided at each of its sides with the outstanding spaced arms 10 the extremities of which being provided with openings to permit said arms to have sliding connection with the rods 11 supported by the wall W' and extending a desired distance above the furnace opening. A pair of arms 10 at one side of the device D' have their intermediate portions 12 outwardly offset so that as the device D' is moved about the rods 11 to the inoperative position as indicated by broken lines in Figure 5 no hindrance or obstruction to such movement will be offered by the keeper 14 for the door 2'. The door 2' is provided at one side with the outstanding arms 15 which are hingedly connected to the wall W', as at 3'. Each of said arms 15 being arcuate to provide an inner recess 16 to bridge the adjacent rod 11 when the door 2' is in closed position.

Referring again to the invention as particularly illustrated in Figures 1 to 4, it is to be noted that the hinged side portion of the device D is provided with a cut out portion or recess 17 so that no hindrance or obstruction will be offered by the keeper 14 to the proper-positioning of the device D in working position. It is also to be noted that the device D is held in desired working position, as at 18, in a conventional manner.

In the form of invention as illustrated in Figure 5, the device D' is held in either its working or inoperative position by the set screws 19 threaded through certain of the arms 10 and having binding contact with the rods 11.

In practice, the oven is thoroughly heated up by a suitable fire within the furnace and then such fire is dumped. It is after the fire has been dumped our improved equalizing device is put into operation and the operation of the device serves to drive the extreme heat which centers directly in front of the fire pot and which is part of the oven into the walls, hearth and arch uniformly throughout the oven. When the device is in operation it is to be understood that the conventional dampers employed in connection with the oven are closed.

From the foregoing description it is thought to be obvious that an equalizing device constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with a baker's oven having a furnace opening in a wall thereof, a heat equalizing device, means for movably supporting said device by said wall to permit the same to be positioned over the opening or away therefrom, said device comprising a plate provided with a relatively large opening registering with the furnace opening when the device is disposed over the furnace opening, said opening of the plate being defined by an outstanding flange to provide a chamber, and a fan supported by said flange and positioned within said chamber.

2. In combination with an oven provided with a furnace opening in a wall thereof, a heat equalizing device, means for holding the same over the furnace opening, said device comprising a plate having an opening, and a fan for directing a blast of air through said opening and into the oven through the furnace opening when the device is positioned over the furnace opening.

3. In combination with a baker's oven provided with a furnace opening in a wall thereof, means for forcing a blast of air within said oven through the furnace opening to uniformly distribute the heat from the furnace within the oven after the fire in the furnace has been dumped.

4. In combination with a baker's oven provided with a furnace opening and a door for said opening, a heat equalizing device comprising a plate, means for movably supporting said plate by the wall, said plate being movable over the furnace opening when the door is in open position and vice versa, and means carried by said plate for forcing an air blast into the oven through the furnace opening when the plate is disposed over said furnace opening.

In testimony whereof we hereunto affix our signatures.

ERVIN L. MILLER.
BERNIE A. SCHULZ.